United States Patent
Wene

(10) Patent No.: US 11,401,165 B2
(45) Date of Patent: Aug. 2, 2022

(54) CARBON MONOXIDE PRODUCTION PROCESS OPTIMIZED BY SOEC

(71) Applicant: HALDOR TOPSØE A/S, Kgs. Lyngby (DK)

(72) Inventor: Henrik C. O. Wene, Malmö (SE)

(73) Assignee: HALDOR TOPSØE A/S, Kgs. Lyngby (DK)

(*) Notice: Subject to any disclaimer, the term of this patent is extended or adjusted under 35 U.S.C. 154(b) by 900 days.

(21) Appl. No.: 16/076,194

(22) PCT Filed: Feb. 20, 2017

(86) PCT No.: PCT/EP2017/053765
§ 371 (c)(1),
(2) Date: Aug. 7, 2018

(87) PCT Pub. No.: WO2017/144403
PCT Pub. Date: Aug. 31, 2017

(65) Prior Publication Data
US 2021/0179436 A1    Jun. 17, 2021

(30) Foreign Application Priority Data

Feb. 26, 2016  (DK) .......................... PA 2016-00122

(51) Int. Cl.
*C01B 32/40* (2017.01)
*C25B 1/23* (2021.01)
(Continued)

(52) U.S. Cl.
CPC ............... *C01B 32/40* (2017.08); *C01B 3/50* (2013.01); *C25B 1/23* (2021.01); *H01M 8/0668* (2013.01);
(Continued)

(58) Field of Classification Search
CPC .................................. C01B 32/40; C25B 1/23
(Continued)

(56) References Cited

U.S. PATENT DOCUMENTS 4,861,351 A    8/1989  Nicholas et al.
7,351,275 B2   4/2008  Dunn
(Continued)

FOREIGN PATENT DOCUMENTS

CN    101892103 A    11/2010
CN    104919023 A     9/2015
(Continued)

OTHER PUBLICATIONS

Chemical Engineering and Processing Panahi et al. V. 50, pp. 247-253 (Year: 2011).*

(Continued)

*Primary Examiner* — Douglas B Call
(74) *Attorney, Agent, or Firm* — Buchanan Ingersoll & Rooney P.C.

(57) ABSTRACT

The invention concerns a process for producing carbon monoxide (CO) from a feed stream comprising carbon dioxide (CO2) and natural gas and/or naphtha the process comprising a syngas generation step, a CO2 removal step and a CO purification step and the process further comprises an SOEC unit which produces CO from a CO2 stream, the process is especially suited for increasing the capacity of existing known CO production plants.

13 Claims, 2 Drawing Sheets

(51) Int. Cl.
*C01B 3/50* (2006.01)
*H01M 8/0668* (2016.01)
*H01M 8/0662* (2016.01)

(52) U.S. Cl.
CPC ... *H01M 8/0681* (2013.01); *C01B 2203/0405* (2013.01); *C01B 2203/046* (2013.01); *C01B 2203/0475* (2013.01)

(58) Field of Classification Search
USPC ....................................................... 423/418.2
See application file for complete search history.

(56) References Cited

U.S. PATENT DOCUMENTS

| | | | |
|---|---|---|---|
| 8,138,380 | B2 | 3/2012 | Olah et al. |
| 8,366,902 | B2 | 2/2013 | Hawkes et al. |
| 9,284,651 | B2 | 3/2016 | Pederson et al. |
| 2003/0191196 | A1* | 10/2003 | Madhubhai ......... C07C 29/1518 518/704 |
| 2005/0066813 | A1 | 3/2005 | Dunn |
| 2007/0045125 | A1 | 3/2007 | Hartvigsen et al. |
| 2008/0023338 | A1 | 1/2008 | Stoots et al. |
| 2009/0235587 | A1 | 9/2009 | Hawkes et al. |
| 2010/0272619 | A1 | 10/2010 | Frydman et al. |
| 2012/0228150 | A1 | 9/2012 | Kang et al. |
| 2014/0076213 | A1 | 3/2014 | Ingram et al. |
| 2014/0194539 | A1 | 7/2014 | Hammad et al. |
| 2014/0272734 | A1 | 9/2014 | Braun et al. |
| 2014/0288195 | A1 | 9/2014 | Castelli et al. |
| 2015/0038741 | A1* | 2/2015 | Pedersen ................... C25B 1/00 562/607 |
| 2016/0040311 | A1 | 2/2016 | Jakobsson et al. |
| 2016/0282044 | A1 | 9/2016 | Hernandez et al. |
| 2017/0022056 | A1* | 1/2017 | Christensen ............ C10L 3/103 |

FOREIGN PATENT DOCUMENTS

| | | |
|---|---|---|
| EP | 0307843 A1 | 3/1989 |
| EP | 2873939 A1 | 5/2015 |
| JP | H04200713 A | 7/1992 |
| JP | 2000233918 A | 8/2000 |
| JP | 2006176400 A | 7/2006 |
| JP | 2015513615 A | 5/2015 |
| JP | 2017524631 A | 8/2017 |
| KP | 20160000940 A | 1/2016 |
| TW | 200526520 A | 8/2005 |
| TW | 201402870 A | 1/2014 |
| WO | 2012003849 A1 | 1/2012 |
| WO | 2013064552 A1 | 5/2013 |
| WO | 2014154253 A1 | 10/2014 |
| WO | 2015015433 A1 | 2/2015 |
| WO | WO2015086752 * | 6/2015 |
| WO | 2015189064 A1 | 12/2015 |

OTHER PUBLICATIONS

Office Action (Notification of the First Office Action) dated Apr. 23, 2021, by the State Intellectual Property Office of People's Republic of China in corresponding Chinese Patent Application No. 201780012896.7 and an English Translation of the Office Action. (11 pages).

Office Action (Notice of Reasons for Rejection) dated Feb. 9, 2021, by the Japanese Patent Office in corresponding Japanese Patent Application No. 2018-544528, and an English Translation of the Office Action. (6 pages).

Meng N."Modeling of a Solid Oxide Electrolysis Cell for Carbon Dioxide Electrolysis", Hong Kong Polytechnic University, 39 pages.

Sune D. et al."Electrolysis of Carbon Dioxide in Solid Oxide Electrolysis Cells", Journal of Power Sources, vol. 193, No. 1, pp. 349-358, Aug. 1, 2009, (21 pages), ISSN: 0378-7753.

Danish Patent Search Report dated Sep. 20, 2016, by the Danish Patent Office in related application No. PA 2016-00122.

International Search Report (PCT/ISA/210) dated May 18, 2017, by the European Patent Office as the International Searching Authority for International Application No. PCT/EP2017/053765.

Written Opinion (PCT/ISA/237) dated May 18, 2017, by the European Patent Office as the International Searching Authority for International Application No. PCT/EP2017/053765.

Office Action (Examination Report) dated Nov. 4, 2020, by the Taiwan Intellectual Property Office in corresponding Taiwanese Patent Application No. 106105927, and an English Translation of the Office Action. (11 pages).

* cited by examiner

CARBON MONOXIDE PRODUCTION PROCESS OPTIMIZED BY SOEC

This invention belongs to the field of electrolysis conducted in solid oxide electrolysis cell (SOEC) stacks. A solid oxide electrolysis cell is a solid oxide fuel cell (SOFC) run in reverse mode, which uses a solid oxide or ceramic electrolyte to produce e.g. oxygen and hydrogen gas by electrolysis of water. It comprises an SOEC core wherein the SOEC stack is housed together with inlets and outlets for process gases. The feed gas, often called the fuel gas, is led to the cathode part of the stack, from where the product gas from the electrolysis is taken out. The anode part of the stack is also called the oxygen side, because oxygen is produced on this side.

The present invention relates carbon monoxide (CO) production in steam reforming based CO plants to a process for producing carbon monoxide (CO) from carbon dioxide ($CO_2$) in a solid oxide electrolysis cell (SOEC) or SOEC stack, wherein $CO_2$ is led to the fuel side of the stack with an applied current and excess oxygen is transported to the oxygen side of the stack, optionally using air or nitrogen to flush the oxygen side, and wherein the product stream from the SOEC, containing CO mixed with $CO_2$, is subjected to a separation process.

In the present invention, the SOEC stack or stacks is boosting CO production in existing steam reforming based CO producing facilities operating by means of steam reformed synthesis gas and subsequent cryogenic or membrane CO purification. CO production by steam reforming yields a co-production of hydrogen which can have high or low value depending on the local circumstances. In cases where hydrogen has a low value the hydrogen production can be suppressed by using feedstock with a high C/H ratio such a naphtha, operating the reformer at a low S/C ratio and/or high temperature, recycling CO2 from the CO2 removal unit and/or adding import CO2.

However due to increasing carbon formation potential on the reforming catalysts it is widely known there is for any given feedstock a limit how low the H2/CO ratio can be pushed in a steam reformer applying the above tricks. Consequently nature sets a limit to how much CO a reformer of a given size can produce before carbon formation sets in or heat transfer limitations of the equipment are reached. In cases additional CO capacity is needed when this point has been reached the only option for producing additional CO is to add steam reforming capacity. Adding reforming capacity is typically only feasible in relatively large increments to achieve reasonable economy of scale, the load on the remaining sections of the syngas plant increases linearly (or more if hex reforming is applied) with the added reforming capacity adding cost, time and complication of revamping an existing facility. Accordingly incremental CO business opportunities have to be of sufficient size to gain the necessary economy of scale for feasibility of a new syngas plant or debottlenecking the existing facility.

It is known that CO may be produced from $CO_2$ by electrolysis. Thus, US 2007/0045125 A1 describes a method for preparing synthesis gas (syngas comprising carbon monoxide and hydrogen) from carbon dioxide and water using a sodium-conducting electrochemical cell. Syngas is also produced by co-electrolysis of carbon dioxide and steam in a solid oxide electrolysis cell.

U.S. Pat. No. 8,138,380 B2 describes an environmentally beneficial method of producing methanol by reductively converting carbon dioxide, said method including a step in which recycled carbon dioxide is reduced to carbon monoxide in an electro-chemical cell.

From US 2008/0023338 A1 a method for producing at least one syngas component by high temperature electrolysis is known. The syngas components hydrogen and carbon monoxide may be formed by decomposition of carbon dioxide and water or steam in a solid oxide electrolysis cell to form carbon monoxide and hydrogen, a portion of which may be reacted with carbon dioxide to form carbon monoxide utilizing the so-called reverse water gas shift (WGS) reaction.

US 2012/0228150 A1 describes a method of decomposing $CO_2$ into C/CO and $O_2$ in a continuous process using electrodes of oxygen deficient ferrites (ODF) integrated with a YSZ electrolyte. The ODF electrodes can be kept active by applying a small potential bias across the electrodes. $CO_2$ and water can also be electrolysed simultaneously to produce syngas ($H_2$+CO) and $O_2$ continuously. Thereby, $CO_2$ can be transformed into a valuable fuel source allowing a $CO_2$ neutral use of hydrocarbon fuels.

Finally, U.S. Pat. No. 8,366,902 B2 describes methods and systems for producing syngas utilising heat from thermochemical conversion of a carbonaceous fuel to support decomposition of water and/or carbon dioxide using one or more solid oxide electrolysis cells. Simultaneous decomposition of carbon dioxide and water or steam by one or more solid oxide electrolysis cells can be employed to produce hydrogen and carbon monoxide.

Besides the above-mentioned patents and patent applications, the concept of electrolysing $CO_2$ in solid oxide electrolysis cells is described in "Modeling of a Solid Oxide Electrolysis Cell for Carbon Dioxide Electrolysis", a publication by Meng Ni of the Hong Kong Polytechnic University, and also by Sune Dalgaard Ebbesen and Mogens Mogensen in an article entitled "Electrolysis of Carbon Dioxide in Solid Oxide Electrolysis Cells", Journal of Power Sources 193, 349-358 (2009).

Specifically the invention we claim is SOEC debottlenecking of steam reforming based CO plants enabling the operator/owner to exploit incremental CO business opportunities exceeding their current CO production capacity with relatively minor investment and down time. The SOEC operates on low pressure CO2 (preferably the CO2 removal unit exhaust as it is free from catalyst poisons while import CO2 could contain contaminants) and converts 5-99% of it into CO. Advantages is that CO2 compression and syngas generation load is unchanged, i.e. no modification or investment required.

Load on CO2 removal unit increases, however much less compared to additional reforming capacity so only minor modifications/investment/downtime required. Load increase on dryer and CO purification unit is essentially limited to extra CO (+low levels of H2, N2 possibly in SOEC product) i.e. no or minor modifications/investments/downtime are likely required.

The electrolysis process in the SOEC requires an operating temperature between 650 and 850° C. Depending on the specific operating conditions, stack configuration and the integrity of the stack, the overall operation can consume heat (i.e. be endothermic), it can be thermoneutral or it can generate heat (i.e. be exothermic). Any operation carried out at such high temperatures also leads to a significant heat loss. This means that typically it will require external heating to reach and maintain the desired operating temperature.

When the operation is carried out at a sufficiently large current in the SOEC stack, the necessary heat will eventually be generated, but at the same time the degradation of the stack will increase. Therefore, in another embodiment of the process external heaters are used to heat the inlet gas on the oxygen side and the fuel side in order to supply heat to the SOEC stack, thereby mitigating this issue. Such external heaters are also useful during start-up as they can provide heat to help the SOEC reach its operating temperature. Suitable feed gas temperatures would be around 700 to 850° C. The external heaters can be electrical, but gas or liquid fuelled external heaters may also be used.

In addition to using inlet gas heaters to obtain the necessary operating temperature, the hot exhaust gas on the oxygen side and the fuel side may be utilized to heat the inlet gas. This is another way to maintain a suitable operating temperature for the SOEC and at the same time reduce the load on the heaters. Thus, by incorporating a feed effluent heat exchanger on both the oxygen side and the fuel side, the issues related to high temperature operation and heat loss are further mitigated. In accordance with the nature of the SOEC operation, mass ($O_2$) is transferred from the fuel side to the oxygen side, which leads to a limitation on the maximum temperature that can be reached in the feed effluent heat exchanger on the fuel side alone. As a consequence of this, there will be an increase of mass through the SOEC on the oxygen side, which leads to the creation of an excess of heat in the SOEC oxygen outlet stream. This in turn leads to a surplus of heat in the outlet stream from the feed effluent heat exchanger on the oxygen side also. Thus, in order to utilize this excess heat on the oxygen side, a third feed effluent heat exchanger is implemented, said third heat exchanger transferring heat from the hot outlet side of the feed effluent heat exchanger on the oxygen side to the cold inlet of the feed effluent heat exchanger on the fuel side. By using electrical tracing in combination with high-temperature insulation on the connecting pipes between the heaters and the heat exchangers as well as between the heat exchangers, the heaters and the stack, the desired temperature level in the SOEC stack can be further conserved.

Features of the Invention

1. A process for producing carbon monoxide (CO) from a feed stream comprising carbon dioxide (CO2) and natural gas and/or naphtha, the process comprising
    a syngas generation step where a first syngas stream is generated from the feed stream,
    a CO2 removal step where at least a part of the CO2 is removed from the first syngas stream and the thereby generated CO2 recycle stream is recycled back to the syngas generation step, and a second syngas stream is generated in said CO2 removal step, and
    a CO purification step where CO is generated from the second syngas stream
    wherein the process further comprises an SOEC unit which is fed by a CO2 stream, the SOEC unit generates CO which is fed back into the first syngas stream, thereby raising the CO concentration in the first syngas stream.

2. A process according to feature 1, wherein the CO2 stream which is fed to the SOEC unit is a recycle by-pass stream comprising at least a part of said CO2 recycle stream.

3. A process according to any of the preceding features, comprising a CO2 import stream which is fed to the syngas generation step.

4. A process according to any of the preceding features, comprising a CO2 import stream which is fed to the SOEC unit.

5. A process according to feature 2, wherein the SOEC unit comprises a compressor adapted to enable the CO2 recycle by-pass stream to overcome the pressure difference from the CO2 recycle stream, through the SOEC unit and piping and back into the first syngas stream.

6. A process according to feature 5, wherein the SOEC unit comprises a pressure reduction valve downstream of the CO2 recycle stream to protect the SOEC unit from exceed pressure.

7. A process according to any of the preceding features, wherein the SOEC unit converts 5-99% of the CO2 fed to the SOEC unit to CO.

8. A process according to any of the preceding features, wherein the SOEC unit converts 20-60% of the CO2 fed to the SOEC unit to CO.

9. A process according to any of the preceding features, wherein the pressure of the first syngas stream is 2-25 Bar(g).

10. A process according to any of the preceding features, wherein the pressure of the first syngas stream is 15-25 Bar(g).

11. A process according to any of the preceding features, wherein the pressure of the CO2 recycle stream is 0-5 Bar(g).

12. A process according to any of the preceding features, wherein the syngas generation step comprises hydrogenation, desulphurization, pre-reforming and reforming.

13. A process according to any of the preceding features, wherein the CO purification step comprises cryogenic or membrane CO purification.

DESCRIPTION OF THE DRAWINGS

The invention is further illustrated by the accompanying drawings showing examples of embodiments of the invention.

POSITION NUMBERS

01. Feed stream
02. Syngas generation step
03. First syngas stream.
04. CO2 removal step.
05. CO2 recycle stream.
06. Second syngas stream.
07. CO purification step.
08. SOEC unit.
09. CO2 stream.
10. CO2 import stream.
11. Pressure reduction valve.

Figure 1:
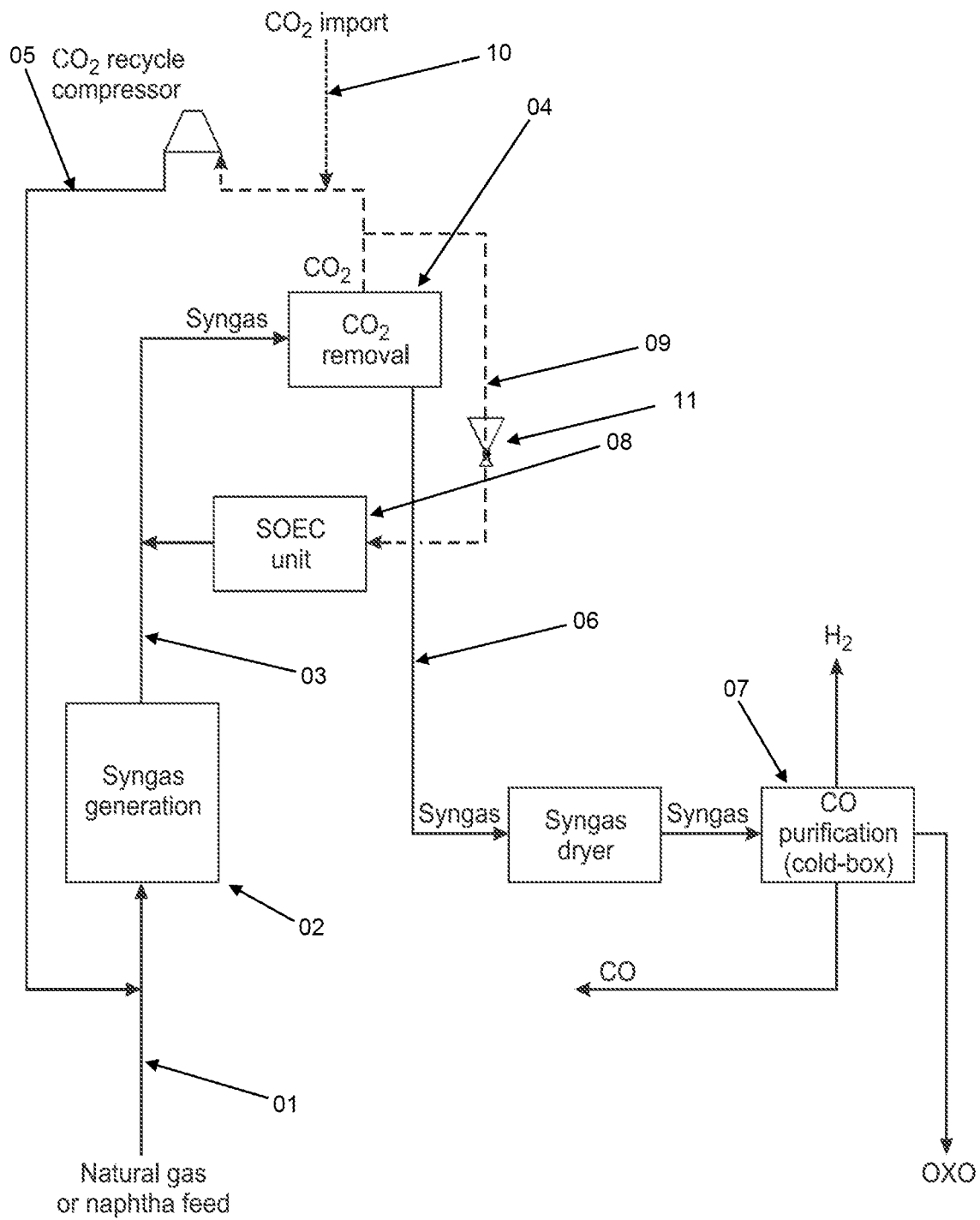
FIG. 1 shows a diagram of the process according to an embodiment of the invention.

The diagram in FIG. 1 shows the CO production process according to an embodiment of the invention. A feed stream, 01 comprising natural gas and/or naphtha feed is led to the syngas generation step, 02, where it is transformed to syngas by a catalytic reaction. The thereby generated first syngas stream, 03 is then led to the CO2 removal step, which generates a CO2 recycle stream which is recycled back into the feed stream by means of a CO2 recycle compressor and a second syngas stream, 06, which is passed further on to the CO purification step, 07 via the syngas dryer. A CO product stream is formed from the second syngas stream by the reaction taking place in the CO purification step.

To increase the efficiency of this known process, an SOEC unit is added to the process, which generates CO from CO2. In the present embodiment, the SOEC unit is fed by at least a part of the CO2 recycle stream which is generated in the CO2 removal step. The CO generated in the SOEC is then fed back into the first syngas stream, thereby increasing the CO concentration of this stream and increasing the overall CO production capacity of the existing process. As the capacity of the existing process is increased, it may be feasible to apply a CO2 import stream, 10 to the system, which may be fed into the CO2 recycle stream. Accordingly the present invention is well suited for revamping existing CO-production plants, increasing their CO production capacity without major equipment replacement.

Figure 2:
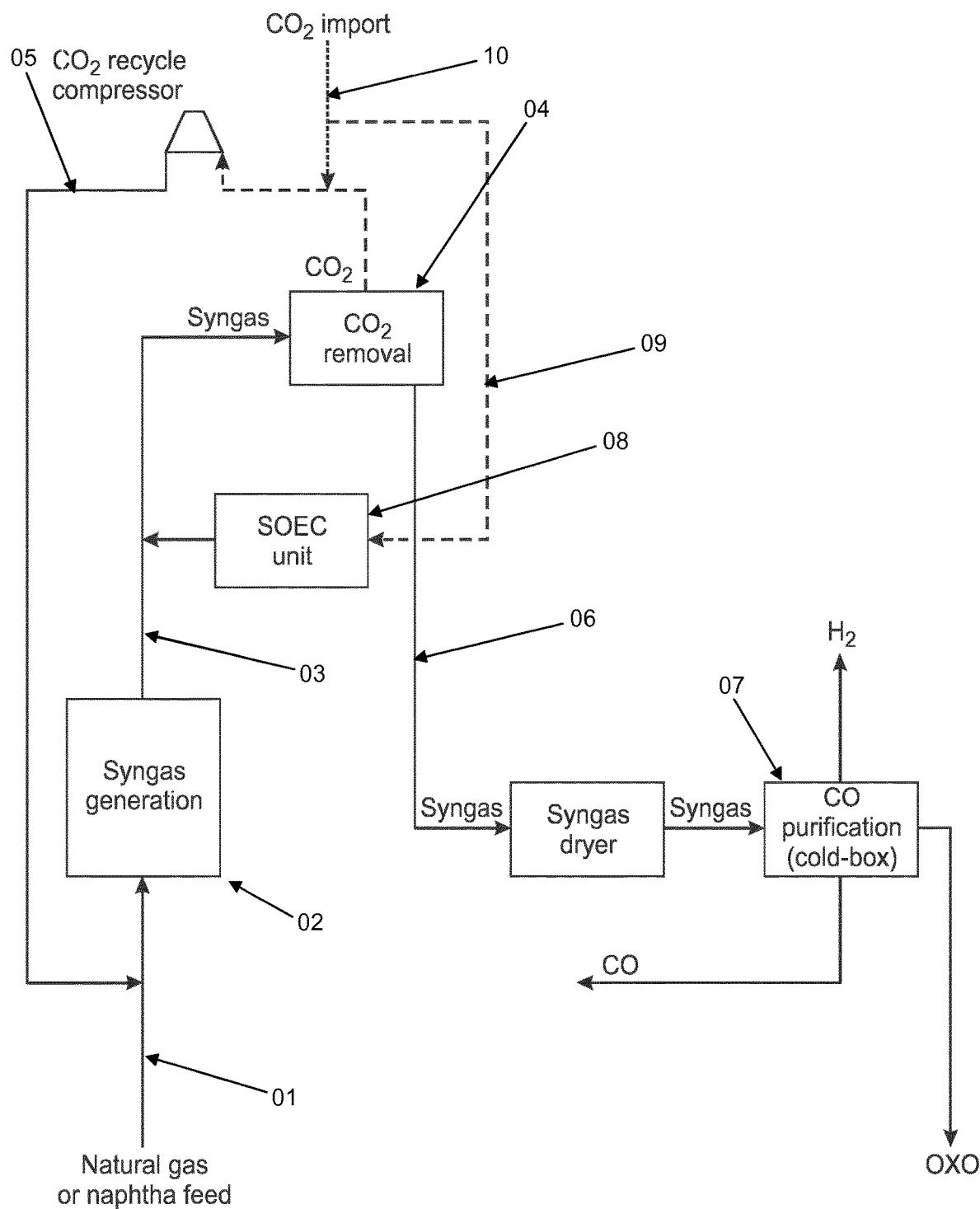
FIG. 2 shows a diagram of the process according to another embodiment of the invention.

In the embodiment of the invention according to FIG. 2, the SOEC unit is fed directly by the CO2 import stream. This embodiment may be advantageous as it requires a minimum of piping and revamping of the existing plant.

The invention claimed is:

1. A process for producing carbon monoxide (CO) from a feed stream comprising carbon dioxide (CO2) and natural gas and/or naphtha, the process comprising
    a syngas generation step where a first syngas stream is generated from the feed stream through a steam reforming process,
    a CO2 removal step where at least a part of the CO2 is removed from the first syngas stream and the thereby generated CO2 recycle stream is recycled back to the syngas generation step, and a second syngas stream is generated in said CO2 removal step, and
    a CO purification step where CO is generated from the second syngas stream,
wherein the process further comprises an SOEC unit which is fed by a CO2 stream, the SOEC unit generates CO which is fed back into the first syngas stream, thereby raising the CO concentration in the first syngas stream.

2. The process according to claim 1, wherein the CO2 stream which is fed to the SOEC unit is a recycle by-pass stream comprising at least a part of said CO2 recycle stream.

3. The process according to claim 2, wherein the SOEC unit comprises a compressor adapted to enable the CO2 recycle by-pass stream to overcome a pressure difference, through the SOEC unit, between the CO2 recycle stream and piping, wherein the CO2 recycle stream is fed back into the first syngas stream.

4. The process according to claim 3, wherein the SOEC unit comprises a pressure reduction valve downstream of the CO2 recycle stream to protect the SOEC unit from excess pressure.

5. The process according to claim 1, comprising a CO2 import stream which is fed to the syngas generation step.

6. The process according to claim 1, comprising a CO2 import stream which is fed to the SOEC unit.

7. The process according to claim 1, wherein the SOEC unit converts 5-99% of the CO2 fed to the SOEC unit to CO.

8. The process according to claim 1, wherein the SOEC unit converts 20-60% of the CO2 fed to the SOEC unit to CO.

9. The process according to claim 1, wherein the pressure of the first syngas stream is 2-25 Bar.

10. The process according to claim 1, wherein the pressure of the first syngas stream is 15-25 Bar.

11. The process according to claim 1, wherein the pressure of the CO2 recycle stream is 0-5 Bar.

12. The process according to claim 1, wherein the syngas generation step comprises hydrogenation, desulphurization, pre-reforming and reforming or any combination thereof of the feed stream.

13. The process according to claim 1, wherein the CO purification step comprises cryogenic or membrane CO purification.

* * * * *